UNITED STATES PATENT OFFICE.

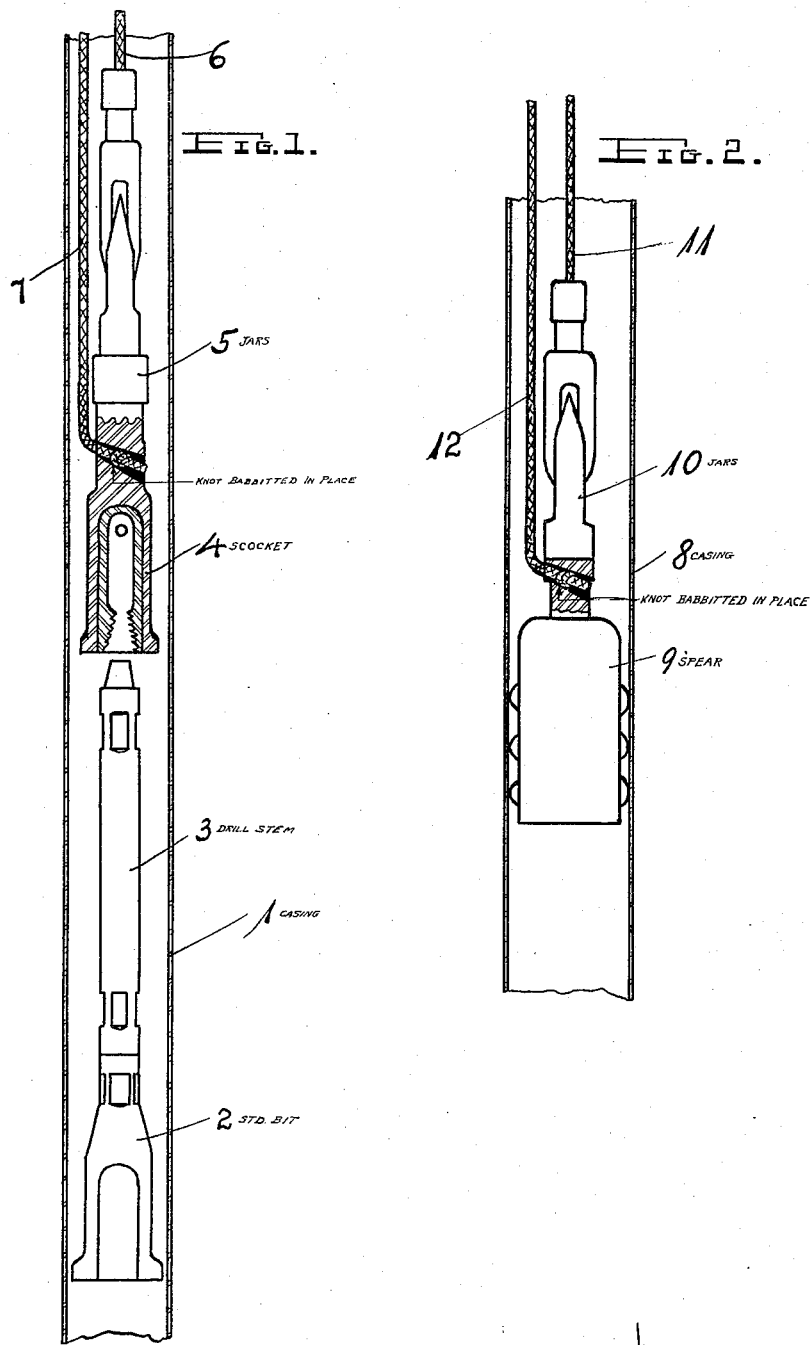

CHARLES W. HENDERSON, OF STRATHMORE, CALIFORNIA.

FISHING-TOOL.

1,156,289.

Specification of Letters Patent.

Patented Oct. 12, 1915.

Application filed January 5, 1914. Serial No. 810,494.

*To all whom it may concern:*

Be it known that I, CHARLES W. HENDERSON, a citizen of the United States, residing at Strathmore, in the county of Tulare, State of California, have invented new and useful Improvements in Fishing-Tools, of which the following is a specification.

This invention relates to a method and apparatus for recovering and lifting lost drilling tools and casing in well operations.

It is the object of this invention to provide a method and apparatus whereby a constant pull may be exerted on the fishing tools when the latter are engaged with a lost drill or casing simultaneous with a jarring action whereby the lost bit or casing may be quickly loosened and removed.

In ordinary well drilling operations the drill stem or bit frequently becomes detached from the drill pipe, also when withdrawing the well casing sections become detached and sometimes necessitate leaving a large proportion of the casing in the well. The lost drill bit or casing is sometimes recovered by means of a fishing tool which is lowered into the well on a cable and engaged with the bit or casing whereupon a series of jars or jerks are imparted to the fishing tool through the medium of the cable attached thereto thus tending to loosen the lost bit or casing. This method while ordinarily effective is objectionable in that considerable time is usually required to effect the loosening of the bit or casing, by reason of the bit or casing returning to its wedged position in the interval between the jars imparted thereto.

In the present method a separate cable is attached to the fishing tool and a constant pull is maintained thereon during the jarring action so as to maintain the drill or casing in its advanced position after each jar thereby insuring a rapid loosening and removal of the bit or casing.

The invention is illustrated in the accompanying drawing, in which:

Figure 1 is a view of the well casing in vertical section indicating the lost bit and drill stem therein with the fishing tool about to be connected thereto and showing the latter partly in vertical section with the auxiliary cable connected therewith. Fig. 2 is a view in vertical section illustrating the fishing tool as employed in engaging lost well casing.

More specifically, 1 indicates a well casing and 2 represents a bit therein which is attached to a drill stem 3 in the usual manner. The fishing tool for engaging the drill stem 3 consists of a socket 4 of any suitable construction formed with a shank attached to the usual jars 5 which in turn are connected to a cable 6 by means of which the fishing tools are lowered into the well casing 1 into engagement with the drill stem 3 and through which cable 6 the jerking action is imparted to the fishing tool and bit to release the latter as is common in tool fishing operations.

The present invention resides in rigidly attaching an auxiliary cable 7 to the shank of the socket 4 and connecting this cable with any suitable mechanism by which a constant pull may be imposed thereon to take up any slack due to the loosening of the bit or stem as they are advanced by the jerking action of the cable 6.

In Fig. 2 the fishing tool is shown as introduced into a pipe or casing 8 and as fitted with a spear 9 for engaging the casing; the fishing tool being also fitted with the usual jars 10 and the jerking cable 11, and to carry out the present invention is provided with the auxiliary cable 12.

The auxiliary cables 7 and 12 are connected to the fishing tools intermediate their drill stem or spear engaging portions and the jar members so that a constant pull on the cables 7 and 12 will be transmitted to the drill stem and spear simultaneous with the jars effected through the cable 6.

In the operation of the invention, the fishing tool is lowered into the well casing by means of the cable 6 or 11 and engaged with the lost bit or casing in the usual manner, whereupon the cables 7 and 12 are subjected to a constant pull simultaneous with the jerking action of the cables 6 or 11, thus insuring a rapid disengagement of the drill stem and bit or casing and enabling their ready removal from the well.

What I claim is:

1. In a device for recovering lost tools and casing, a fishing tool, a jar device attached thereto, a cable connecting with the jar device, whereby a series of jerks may be imparted to the fishing tool, and an auxiliary cable connected intermediate the fishing tool and the jar device through which a constant pull may be exerted on the fishing tool simultaneous with the jerking action thereon.

2. A fishing tool apparatus, comprising a fishing tool of the usual construction having a tapered bore extending transversely therethrough, a jar device connected therewith, an operating cable connected to the jar device, and an auxiliary cable, the lower end of said cable being secured in the transverse bore of said fishing tool, whereby a constant pull may be exerted on the fishing tool through the auxiliary cable simultaneous with the jarring action imparted thereto by the operating cable.

CHARLES W. HENDERSON.

Witnesses:
B. A. CROWLEY,
H. ROTH.

Copies of this patent may be obtained for five cents each, by addressing the "Commissioner of Patents, Washington, D. C."